United States Patent
Honda et al.

(10) Patent No.: US 12,531,275 B2
(45) Date of Patent: Jan. 20, 2026

(54) METHOD FOR MANUFACTURING LAMINATED BATTERY

(71) Applicant: Panasonic Intellectual Property Management Co., Ltd., Osaka (JP)

(72) Inventors: Kazuyoshi Honda, Osaka (JP); Akira Kawase, Osaka (JP); Eiichi Koga, Osaka (JP); Tsutomu Koshizuka, Osaka (JP); Takeshi Yamasaki, Osaka (JP); Masatoshi Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 669 days.

(21) Appl. No.: 17/929,773

(22) Filed: Sep. 6, 2022

(65) Prior Publication Data

US 2022/0416310 A1    Dec. 29, 2022

Related U.S. Application Data

(63) Continuation of application No. PCT/JP2021/005399, filed on Feb. 15, 2021.

(30) Foreign Application Priority Data

Mar. 30, 2020   (JP) ................................ 2020-059533

(51) Int. Cl.
  *H01M 10/0585*    (2010.01)
  *H01M 10/48*    (2006.01)

(52) U.S. Cl.
  CPC ..... *H01M 10/0585* (2013.01); *H01M 10/482* (2013.01)

(58) Field of Classification Search
  CPC .. H01M 10/0585; H01M 10/482; Y02P 70/50
  See application file for complete search history.

(56) References Cited

U.S. PATENT DOCUMENTS

| | | | | |
|---|---|---|---|---|
| 6,132,477 A | * | 10/2000 | Warren | H01M 10/0525 156/182 |
| 10,367,082 B2 | * | 7/2019 | Saito | H01M 50/512 |

(Continued)

FOREIGN PATENT DOCUMENTS

| | | |
|---|---|---|
| JP | 2010-232011 | 10/2010 |
| JP | 2015-179566 | 10/2015 |
| JP | 2017-111940 | 6/2017 |

OTHER PUBLICATIONS

International Search Report of PCT application No. PCT/JP2021/005399 dated Apr. 27, 2021.

*Primary Examiner* — Minh N Trinh
(74) *Attorney, Agent, or Firm* — Greenblum & Bernstein, P.L.C.

(57) ABSTRACT

A method for manufacturing a laminated battery is a method for manufacturing a laminated battery in which a plurality of unit battery cells each having a negative-electrode layer, a positive-electrode layer are laminated, and a solid electrolyte layer located between the negative-electrode layer and the positive-electrode layer. The method includes laminating the plurality of unit battery cells and collectively compressing, in a direction of laminating, the plurality of unit cells laminated in the laminating. In the laminating, the plurality of unit battery cells are laminated in such an arrangement that two unit battery cells located at both ends in the direction of laminating are both lower in degree of compression than a unit battery cell located between the two unit battery cells.

11 Claims, 10 Drawing Sheets

(56) References Cited

U.S. PATENT DOCUMENTS

| | | | | |
|---|---|---|---|---|
| 2004/0038123 A1* | 2/2004 | Hisamitsu | ......... | H01M 10/0445 |
| | | | | 429/61 |
| 2015/0270585 A1* | 9/2015 | Sasaoka | ............ | H01M 10/0468 |
| | | | | 429/157 |
| 2022/0416309 A1* | 12/2022 | Honda | ................ | H01M 10/482 |
| 2022/0416310 A1* | 12/2022 | Honda | ................ | H01M 10/482 |

* cited by examiner

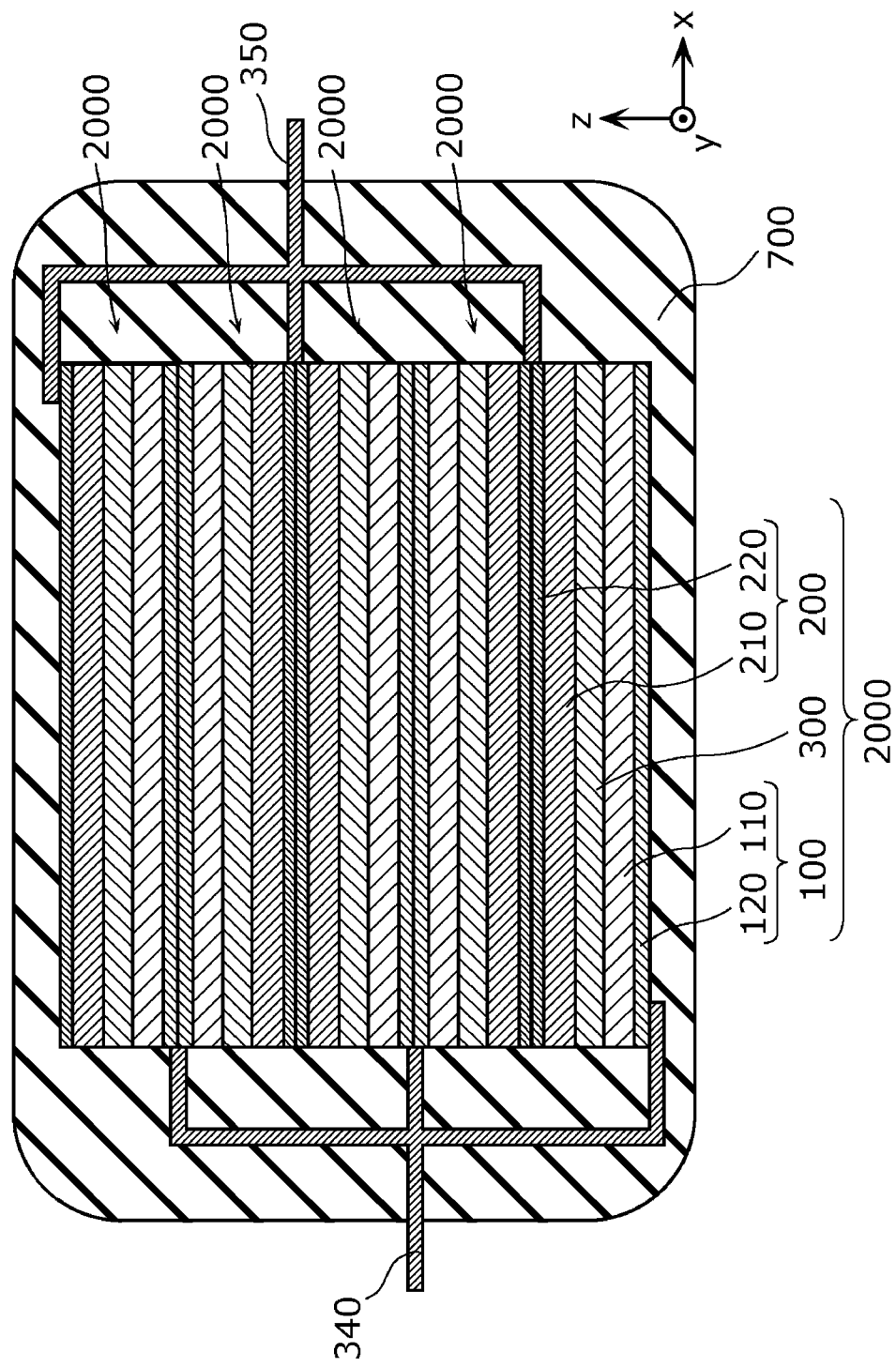

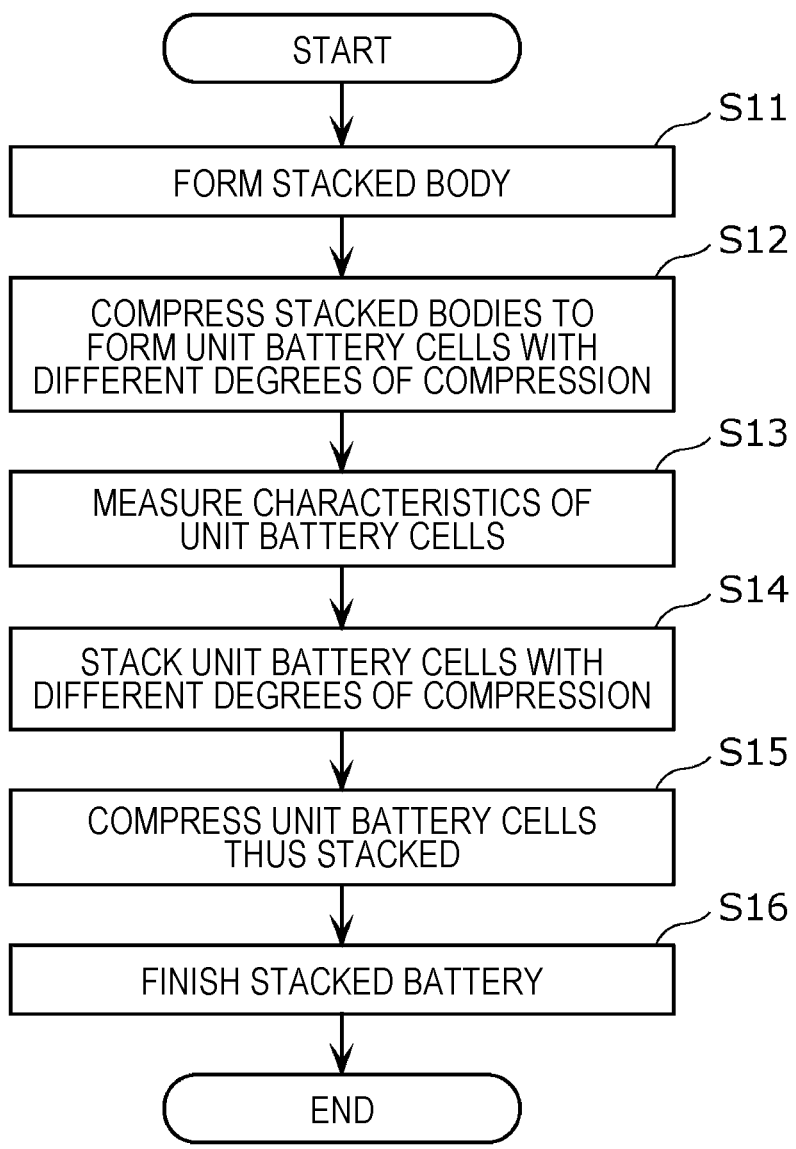

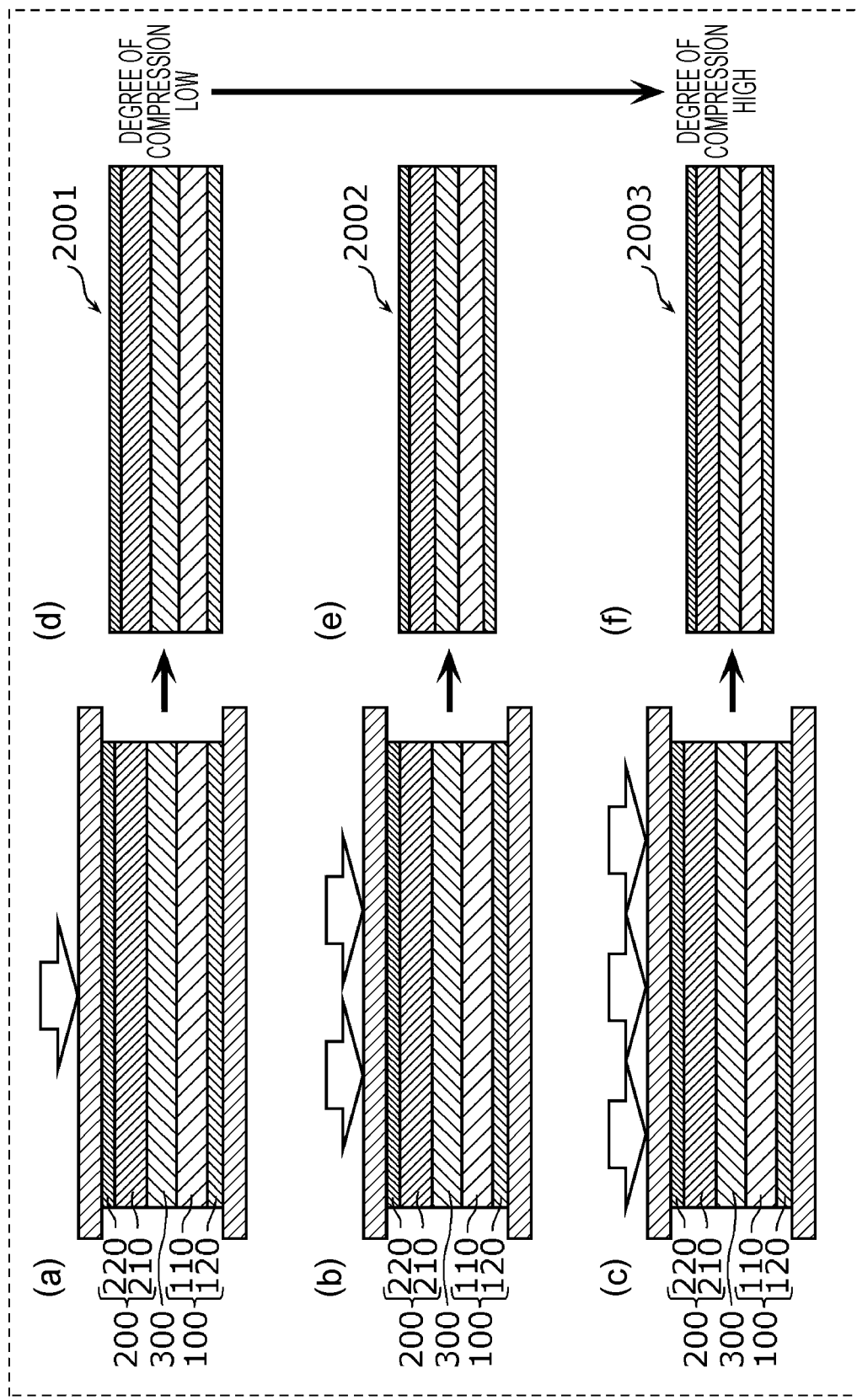

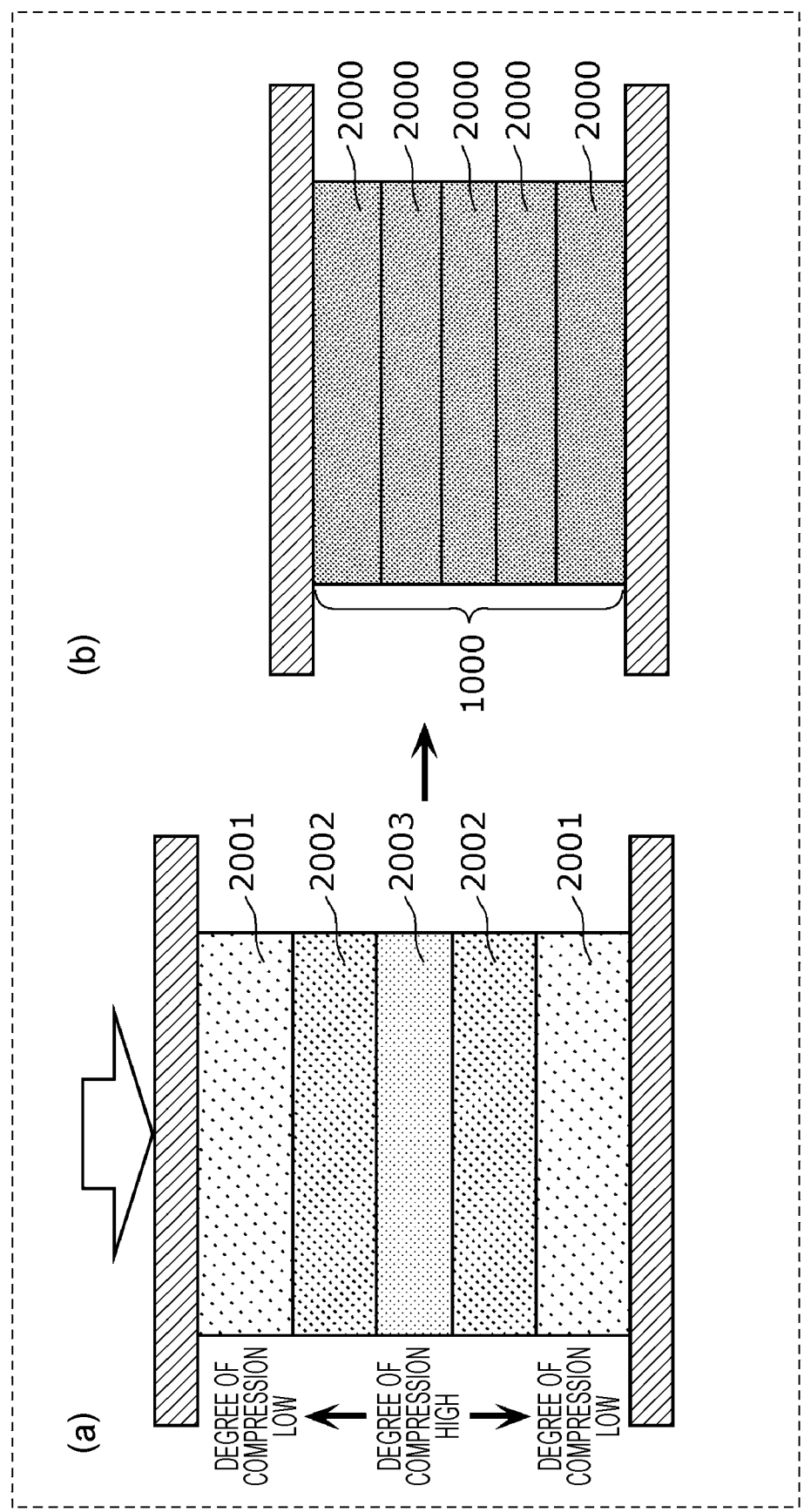

METHOD FOR MANUFACTURING LAMINATED BATTERY

BACKGROUND

1. Technical Field

The present disclosure relates to a method for manufacturing a laminated battery.

2. Description of the Related Art

Japanese Unexamined Patent Application Publication No. 2017-111940 discloses charging a battery assembly without applying constraining load in a direction of laminating of positive and negative electrodes until a preset intermediate SOC (state-of-charge) value is reached after the start of charging and charging the battery assembly while applying constraining load in the direction of laminating from the intermediate SOC value to a targeted SOC value.

Japanese Unexamined Patent Application Publication No. 2015-179566 discloses a solid battery including a laminated body including at least one electric cell including a positive-electrode layer containing a positive-electrode active material, a negative-electrode layer containing a negative-electrode active material, and a solid electrolyte layer laminated between the positive-electrode layer and the negative-electrode layer and an exterior accommodating the laminated body. The solid battery includes a pressure receiver provided in at least part of the edge of the exterior, and is structured such that the pressure receiver has a thickness less than a total thickness of the laminated body and the exterior in a direction of laminating of the electric cell.

Japanese Unexamined Patent Application Publication No. 2010-232011 discloses a secondary battery in which a positive electrode and a negative electrode are laminated with an electrolyte-containing separator sandwiched therebetween. In the secondary battery, an electrode layer of one of electrode plates of the positive and negative electrodes is formed to be lower in density than an electrode layer of the other of the electrode plates.

SUMMARY

Of the conventional technologies, further improvement in reliability of a battery is required. Of laminated batteries, improvement in reliability is particularly required, as they are high in battery capacity and/or voltage.

One non-limiting and exemplary embodiment provides a method for manufacturing a laminated battery with enhanced reliability.

In one general aspect, the techniques disclosed here feature a method for manufacturing a laminated battery in which a plurality of unit battery cells each having a negative-electrode layer, a positive-electrode layer, and a solid electrolyte layer located between the negative-electrode layer and the positive-electrode layer are laminated. The method includes laminating the plurality of unit battery cells and collectively compressing, in a direction of laminating, the plurality of unit cells laminated in the laminating. In the laminating, the plurality of unit battery cells are laminated in such an arrangement that two unit battery cells located at both ends in the direction of laminating are both lower in degree of compression than a unit battery cell located between the two unit battery cells.

The present disclosure makes it possible to enhance the reliability of a laminated battery.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a cross-sectional view schematically showing a configuration of a laminated battery including a sealing member according to the modification of the embodiment;

FIG. 5 is a flow chart for explaining a method for manufacturing a laminated battery according to the embodiment;

FIG. 8 is a diagram for explaining an example of adjustment of the degrees of compression of a unit battery cells in the individual compressing step according to the embodiment;

FIG. 10 is a diagram for explaining a laminating step and a collective compressing step according to the embodiment.

DETAILED DESCRIPTIONS

Figure 1:
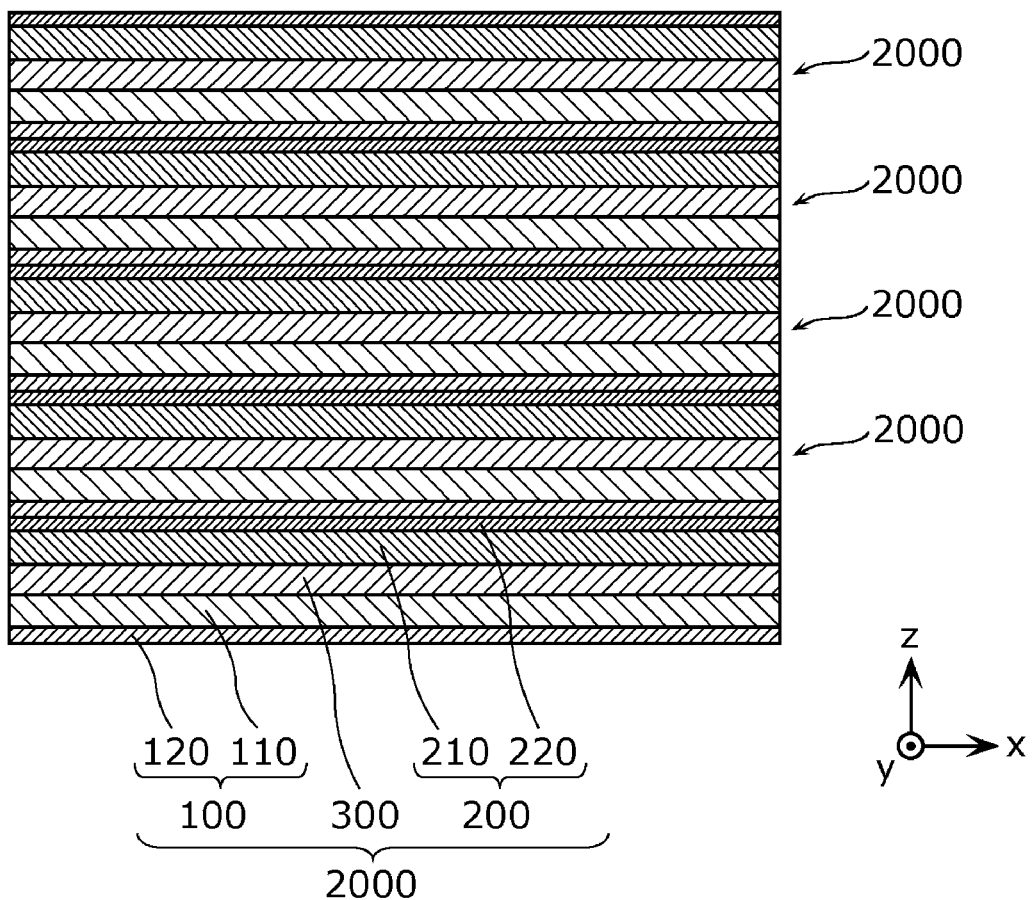
FIG. 1 is a cross-sectional view schematically showing a configuration of a laminated battery according to an embodiment.

Underlying Knowledge Forming Basis of the Present Disclosure

It is important for a laminated battery to be constituted by unit battery cells of uniform battery capacity. Variations in the battery capacity of the unit battery cells easily lead to over-charge and over-discharge in a series-connected laminated battery and tend to cause variations in the current value of the collecting leads of electrodes in a parallel-connected laminated battery, resulting in degradation in reliability of the batteries.

To address this problem, the present disclosure provides a method for manufacturing a laminated battery and a laminated battery with enhanced reliability.

Brief Overview of the Present Disclosure

A method for manufacturing a laminated battery according to an aspect of the present disclosure is a method for manufacturing a laminated battery in which a plurality of unit battery cells each having a negative-electrode layer, a positive-electrode layer, and a solid electrolyte layer located between the negative-electrode layer and the positive-electrode layer are laminated. The method includes laminating the plurality of unit battery cells and collectively compressing, in a direction of laminating, the plurality of unit cells laminated in the laminating. In the laminating, the plurality of unit battery cells are laminated in such an arrangement that two unit battery cells located at both ends in the direction of laminating are both lower in degree of compression than a unit battery cell located between the two unit battery cells.

Thus, in the laminating, the plurality of unit battery cells are laminated such that unit battery cells that are lower in degree of compression than a unit battery cell located closer to the center in the direction of laminating are located at both ends in the direction of laminating. Further, in the collectively compressing, the pressure that compresses the unit battery cells, located at both ends, that are relatively low in degree of compression acts relatively strongly, and the pressure that compresses the unit battery cell, located closer to the center, that is relatively high in degree of compression acts relatively weakly. Since the unit battery cells of different degrees of compression are laminated in the aforementioned arrangement, variations in the degree of compression of the unit battery cells caused by the differences in action of the compressing pressures in the collectively compressing can be canceled out. This makes it possible to reduce variations in the degree of compression of a plurality of unit battery cells to be formed after the collectively compressing. Further, the battery capacity becomes higher as the compression joining of a unit battery cell progresses and the degree of compression becomes higher. This makes it possible to also reduce variations in the battery capacity of the unit battery cells by reducing the variations in the degree of compression of the plurality of unit battery cells.

This results in making it possible to, in a case where the series-connected laminated battery is manufactured, inhibit each of the plurality of unit battery cells, for example, from being over-charged or over-discharged. Further, in a case where the parallel-connected laminated battery is manufactured, variations in current flowing through collecting leads through which a current is extracted from electrodes can be reduced. This makes it possible to reduce local heat generation of the unit battery cells attributed to an excessive rise in temperature or other factors due to the flow of an excess current. Therefore, the method for manufacturing a laminated battery according to the present embodiment makes it possible to reduce unsafe events such as degradation and heat generation of the unit battery cells, making it possible to manufacture a laminated battery with enhanced reliability.

Further, for example, the method may further include individually compressing, in the direction of laminating, a laminated body in which the positive-electrode layer, the negative-electrode layer, and the solid electrolyte layer are laminated and thereby forming each of the plurality of unit battery cells to be laminated in the laminating. wherein the individually compressing is performed prior to the laminating.

This makes it possible to form, according to the characteristics or other features of the laminated battery to be manufactured, the plurality of unit battery cells to be laminated in the laminating.

Further, for example, the method may further include measuring respective characteristics of the plurality of unit battery cells. In the individually compressing, respective degrees of compression of the plurality of unit battery cells to be laminated in the laminating may be adjusted on the basis of the characteristics measured in the measuring.

Thus, on the basis of the characteristics measured in the measuring, the degrees of compression of the plurality of unit battery cells formed in the individually compressing can be adjusted so that variations in the degree of compression of the unit battery cells of the laminated battery to be manufactured are reduced. This makes it possible to further reduce the variations in the battery capacity of the plurality of unit battery cells.

Further, for example, in the measuring, respective electrical characteristics of the plurality of unit battery cells may be measured as the characteristics.

In a unit battery cell in which a negative-electrode layer, a positive-electrode layer, and a solid electrolyte layer are laminated, the battery capacity becomes higher as the degree of compression becomes higher, so that there is a change in electrical characteristic. This makes it possible to estimate the battery capacities and degrees of compression of the unit battery cells by measuring the electrical characteristics of the unit battery cells in the measuring.

Further, for example, in the measuring, respective charge and discharge characteristics of the plurality of unit battery cells may be measured as the electrical characteristics.

This makes it possible to precisely estimate the battery capacities and degrees of compression of the plurality of unit battery cells, as the measurement of the charge and discharge characteristics allows quantities of electricity and voltages associated with the battery capacities to be measured.

Further, for example, in the measuring, the charge and discharge characteristics may be measured in a region lower than or equal to 10% of the battery capacities of the plurality of unit battery cells.

This makes it possible to make the duration of measurement of the charge and discharge characteristics shorter than in a fully charged condition, as the charge and discharge characteristics are measured in some regions of the battery capacities of the unit battery cells. Further, even with the charge and discharge characteristics measured in some regions of the battery capacities, the battery capacities and degrees of compression of the unit battery cells can be estimated, as the amounts of rise in voltage of the unit battery cells with respect to the quantities of charging electricity at an early stage of charging are correlated with the battery capacities. This makes it possible to manufacture the laminated battery with high producibility. Further, since a small quantity of electricity is charged, only a small amount of current flows even at the occurrence of a short circuit or other failures due to contact between a negative-electrode layer and a positive-electrode layer during the manufacture, so that heat generation or other events are reduced. This makes it possible to enhance the safety with which the laminated battery is manufactured.

Further, for example, a duration of measurement of the charge and discharge characteristics may be shorter than or equal to one minute.

This makes it possible to estimate the battery capacities and degrees of compression of the unit batter cells even when the duration of measurement of the charge and discharge characteristics is short, as the amounts of rise in voltage of the unit battery cells with respect to the quantities of charging electricity at an early stage of charging are correlated with the battery capacities. This makes it possible to manufacture the laminated battery with high producibility.

Further, for example, in the measuring, respective impedances of the plurality of unit battery cells may be measured as the electrical characteristics.

This makes it possible to estimate the battery capacities and degrees of compression of the unit battery cells simply by measuring the impedances of the unit battery cells, as the impedances and battery capacities of the unit battery cells are correlated with each other. This makes it possible to manufacture the laminated battery with high producibility.

Further, for example, in the measuring, respective mechanical characteristics of the plurality of unit battery cells may be measured as the characteristics.

Measuring such mechanical characteristics makes it possible to directly check the degrees of compression of the unit battery cells.

Further, for example, in the measuring, respective mechanical deformation amounts of the plurality of unit battery cells may be measured as the mechanical characteristics by a contact displacement meter, an optical displacement meter, or a gap gauge.

This makes it possible to also measure the mechanical characteristics while compressing the unit battery cells, thus making it possible to shorten the processing time. This makes it possible to manufacture the laminated battery with high producibility.

Further, for example, in the laminating, the plurality of unit battery cells may be laminated in such an arrangement that one unit battery cell located closer to an end in the direction of laminating is smaller in degree of compression than or equal in degree of compression to the other unit battery cell.

This causes the unit battery cells to be laminated in such an arrangement that the degree of compression of a unit battery cell located closer to the center in the direction of laminating is lower than the degree of compression of a unit battery cell located closer to either end in the direction of laminating so that increases in degree of compression by the action of the compressing pressure in the collectively compressing are canceled out, although the action becomes stronger from the center toward either end in the direction of laminating. This makes it possible to further reduce the variations in the degree of compression of the unit battery cells after the collectively compressing.

The following describes an embodiment of the present disclosure with reference to the drawings.

It should be noted that the embodiments to be described below each illustrate a comprehensive and specific example. The numerical values, shapes, materials, constituent elements, placement and topology of constituent elements, steps, orders of steps, or other features that are shown in the following embodiments are just a few examples and are not intended to limit the present disclosure. Further, those of the constituent elements in the following embodiments which are not recited in an independent claim are described as optional constituent elements.

Further, the drawings are schematic views, and are not necessarily strict illustrations. Accordingly, for example, the drawings are not necessarily to scale. In the drawings, substantially the same components are given the same reference signs, and a repeated description may be omitted or simplified.

Further, terms such as "parallel" used herein to show the way in which elements are interrelated, terms such as "rectangular" used herein to show the shape of an element, and ranges of numerical values used herein are not expressions that represent only exact meanings but expressions that are meant to also encompass substantially equivalent ranges, e.g. differences of approximately several percent.

Further, in the present specification and drawings, the x axis, the y axis, and the z axis represent the three axes of a three-dimensional orthogonal coordinate system. In each of the embodiments, the z-axis direction is a thickness direction of a battery. Further, a positive direction parallel with the z axis is upward in the z-axis direction, and a negative direction parallel with the z axis is downward in the z-axis direction. Further, the term "thickness direction" used herein means a direction parallel with a direction of laminating of a laminated battery and unit battery cells, i.e. a direction perpendicular to a principal surface of each layer.

Further, the term "plan view" used herein means a case where the laminated battery and the unit battery cells are seen from an angle parallel with the thickness direction.

Further, a negative-electrode collector and a positive-electrode collector are sometimes collectively referred to simply as "collectors". Further, a negative-electrode active material layer and a positive-electrode active material layer are sometimes collectively referred to simply as "active material layers".

Embodiment

First, a configuration of a laminated battery according to the present embodiment is described.

FIG. 1 is a cross-sectional view schematically showing a configuration of a laminated battery 1000 according to the present embodiment.

As shown in FIG. 1, the laminated battery 1000 according to the present embodiment includes a plurality of unit battery cells 2000. Specifically, the laminated battery 1000 has a structure in which the plurality of unit battery cells 2000 are laminated. The plurality of unit battery cells 2000 are electrically connected in series to one another to constitute the laminated battery 1000. The laminated battery 1000 is for example a secondary battery that is capable of being repeatedly charged and discharged.

Each of the unit battery cells 2000 includes a negative-electrode layer 100, a positive-electrode layer 200, and a solid electrolyte layer 300 located between the negative-electrode layer 100 and the positive-electrode layer 200. The plurality of unit battery cells 2000 are laminated such that their electrodes are facing in the same orientation. That is, in the laminated battery 1000, adjacent unit battery cells 2000 are laminated such that the negative-electrode layer 100 of one of the adjacent unit battery cells 2000 and the positive-electrode layer 200 of the other of the adjacent unit battery cells 2000 are adjacent to each other. This causes the laminated battery 1000 to be a series-connected laminated battery in which the plurality of unit battery cells 2000 are electrically connected in series to one another.

The negative-electrode layer 100 and the positive electrode layer 200 face each other across the solid electrolyte layer 300. In the illustrated example, each of the unit battery cells 2000 includes a pair of negative-electrode and positive-electrode layers 100 and 200 facing each other across a solid electrolyte layer 300. However, this is not intended to impose any limitation. Each of the unit battery cells 2000 may include two or more of at least any of the negative-electrode layer 100, the positive-electrode layer 200, and the solid electrolyte layer 300.

In each of the unit battery cells 2000, the negative-electrode layer 100, the solid electrolyte layer 300, and the positive-electrode layer 200 are laminated in this order along a thickness direction (z-axis direction) of the unit battery cell 2000. More specifically, in each of the unit battery cells 2000, a negative-electrode collector 120, a negative-electrode active material layer 110, the solid electrolyte layer 300, a positive-electrode active material layer 210, and a positive-electrode collector 220 are laminated in this order along the thickness direction of the unit battery cell 2000.

The negative-electrode layer 100 includes the negative-electrode active material layer 110 and the negative-electrode collector 120. The negative-electrode active material layer 110 is located between the solid electrolyte layer 300 and the negative-electrode collector 120. The thickness of the negative-electrode active material layer 110 is for example greater than or equal to 5 µm and less than or equal to 300 µm, but is not limited to these values.

The negative-electrode active material layer 110 contains, for example, a negative-electrode active material as an electrode material. Usable examples of the negative-electrode active material contained in the negative-electrode active material layer 110 include negative-electrode active materials such as graphite and metal lithium. As a material of the negative-electrode active material, any of various materials from and into which ions such as lithium (Li) or magnesium (Mg) ions can be desorbed or inserted may be used.

Further, usable examples of the material contained in the negative-electrode active material layer 110 include solid electrolytes such as inorganic solid electrolytes. Usable examples of inorganic solid electrolytes include sulfide solid electrolytes or oxide solid electrolytes. Usable examples of sulfide solid electrolytes include a mixture of lithium sulfide ($Li_2S$) and phosphorus pentasulfide ($P_2S_5$). Further, usable examples of the material contained in the negative-electrode active material layer 110 include electrically-conducting agents such as acetylene black, carbon black, graphite, and carbon fiber or binding binders such as polyvinylidene fluoride.

The negative-electrode collector 120 is in contact with the negative-electrode active material layer 110. The thickness of the negative-electrode collector 120 is for example greater than or equal to 5 µm and less than or equal to 100 µm, but is not limited to these values. The negative-electrode collector 120 is a member having electrical conductivity. The negative-electrode collector 120 may for example be a thin film having electrical conductivity. Usable examples of a material that constitutes the negative-electrode collector 120 include metals such as stainless steel (SUS), aluminum (Al), copper (Cu), and nickel (Ni). Specifically, usable examples of the negative-electrode collector 120 include metallic foil such as SUS foil, Cu foil, and Ni foil.

Another layer such as a joining layer constituted by an conductive material may be provided between the negative-electrode active material layer 110 and the negative-electrode collector 120. Further, the negative-electrode layer 100 does not need to include the negative-electrode collector 120, and for example, collectors of adjacent unit battery cells 2000, an extraction electrode, a substrate that supports the laminated battery 1000, or other components may function as a collector of the negative-electrode active material layer 110. That is, the negative-electrode layer 100 may include only the negative-electrode active material layer 110 out of the negative-electrode active material layer 110 and the negative-electrode collector 120.

The positive-electrode layer 200 includes the positive-electrode active material layer 210 and the positive-electrode collector 220. The positive-electrode active material layer 210 is located between the solid electrolyte layer 300 and the positive-electrode collector 220. The thickness of the positive-electrode active material layer 210 is for example greater than or equal to 5 µm and less than or equal to 300 µm, but is not limited to these values.

The positive-electrode active material layer 210 contains, for example, a positive-electrode active material as an electrode material. The positive-electrode active material is a material that constitutes the extreme opposite of the negative-electrode active material.

Usable examples of the positive-electrode active material contained in the positive-electrode active material layer 210 include positive-electrode active materials such as a lithium cobalt oxide complex oxide (LCO), a lithium nickel oxide complex oxide (LNO), a lithium manganese oxide complex oxide (LMO), a lithium-manganese-nickel complex oxide (LMNO), a lithium-manganese-cobalt complex oxide (LMCO), a lithium-nickel-cobalt complex oxide (LNCO), and a lithium-nickel-manganese-cobalt complex oxide (LNMCO).

As a material of the positive-electrode active material, any of various materials from and into which ions such as Li or Mg ions can be desorbed or inserted may be used.

Further, usable examples of the material contained in the positive-electrode active material layer 210 include solid electrolytes such as inorganic solid electrolytes. Usable examples of inorganic solid electrolytes include sulfide solid electrolytes or oxide solid electrolytes. Usable examples of sulfide solid electrolytes include a mixture of lithium sulfide ($Li_2S$) and phosphorus pentasulfide ($P_2S_5$). The positive-electrode active material may have its surface coated with a solid electrolyte. Further, usable examples of the material contained in the positive-electrode active material layer 210 include conductive agents such as acetylene black, carbon black, graphite, and carbon fiber or binding binders such as polyvinylidene fluoride.

The positive-electrode collector 220 is in contact with the positive-electrode active material layer 210. The thickness of the positive-electrode collector 220 is for example greater than or equal to 5 µm and less than or equal to 100 µm, but is not limited to these values. The positive-electrode collector 220 is a member having electrical conductivity. The positive-electrode collector 220 may for example be a thin film having electrical conductivity. Usable examples of a material that constitutes the positive-electrode collector 220 include metals such as stainless steel (SUS), aluminum (Al), copper (Cu), and nickel (Ni). Specifically, usable examples of the positive-electrode collector 220 include metallic foil such as SUS foil, Cu foil, and Ni foil.

Another layer such as a joining layer constituted by an conductive material may be provided between the positive-electrode active material layer 210 and the positive-electrode collector 220. Further, the positive-electrode layer 200 does not need to include the positive-electrode collector 220, and for example, collectors of adjacent unit battery cells 2000, an extraction electrode, a substrate that supports the laminated battery 1000, or other components may function as a collector of the positive-electrode active material layer 210. That is, the positive-electrode layer 200 may include only the positive-electrode active material layer 210 out of the positive-electrode active material layer 210 and the positive-electrode collector 220.

The solid electrolyte layer 300 is disposed between the negative-electrode active material layer 110 and the positive-electrode active material layer 210. The solid electrolyte layer 300 is in contact with each of the negative-electrode and positive-electrode active material layers 110 and 210. The thickness of the solid electrolyte layer 300 may be greater than or equal to 5 μm and less than or equal to 300 μm or may be greater than or equal to 5 μm and less than or equal to 100 μm.

In the present embodiment, the negative-electrode active material layer 110, the positive-electrode active material layer 210, and the solid electrolyte layer 300 are maintained in a parallel plate state. This makes it possible to reduce the occurrence of breaks or collapses due to curving. The negative-electrode active material layer 110, the positive-electrode active material layer 210, and the solid electrolyte layer 300 may be smoothly curved in combination.

The solid electrolyte layer 300 is a layer containing an electrolyte material. As the electrolyte material, a generally known electrolyte for use in a battery may be used. The solid electrolyte layer 300 contains a solid electrolyte as an electrolyte. The unit battery cells 2000 may for example be all-solid batteries.

Usable examples of the solid electrolyte include solid electrolytes such as inorganic solid electrolytes. Usable examples of inorganic solid electrolytes include sulfide solid electrolytes or oxide solid electrolytes. Usable examples of sulfide solid electrolytes include a mixture of lithium sulfide ($Li_2S$) and phosphorus pentasulfide ($P_2S_5$). The solid electrolyte layer 300 may contain a binding binder such as polyvinylidene fluoride in addition to the electrolyte material.

The plurality of unit battery cells 2000 of the laminated battery 1000 shown in FIG. 1 are manufactured such that there are only small variations in the degree of compression and battery capacity of the unit battery cells 2000. A manufacturing method for reducing variations in degree of compression and battery capacity will be described later.

In the laminated battery 1000, a current of the same magnitude flows through each of the plurality of unit battery cells 2000 electrically connected in series to one another. Therefore, in a case where there are variations in the battery capacity of the plurality of unit battery cells 2000, the unit battery cells 2000 become over-charged and over-discharged. On the other hand, in the laminated battery 1000 according to the present embodiment, there are only small variations in the respective battery capacities of the plurality of unit battery cells 2000 This makes it possible in the laminated battery 1000 to inhibit the unit battery cells 2000, for example, from being over-charged or over-discharged. This results in making it possible to reduce unsafe events such as degradation and heat generation of the unit battery cells 2000. This brings about enhancement in reliability of the laminated battery 1000.

Figure 2:
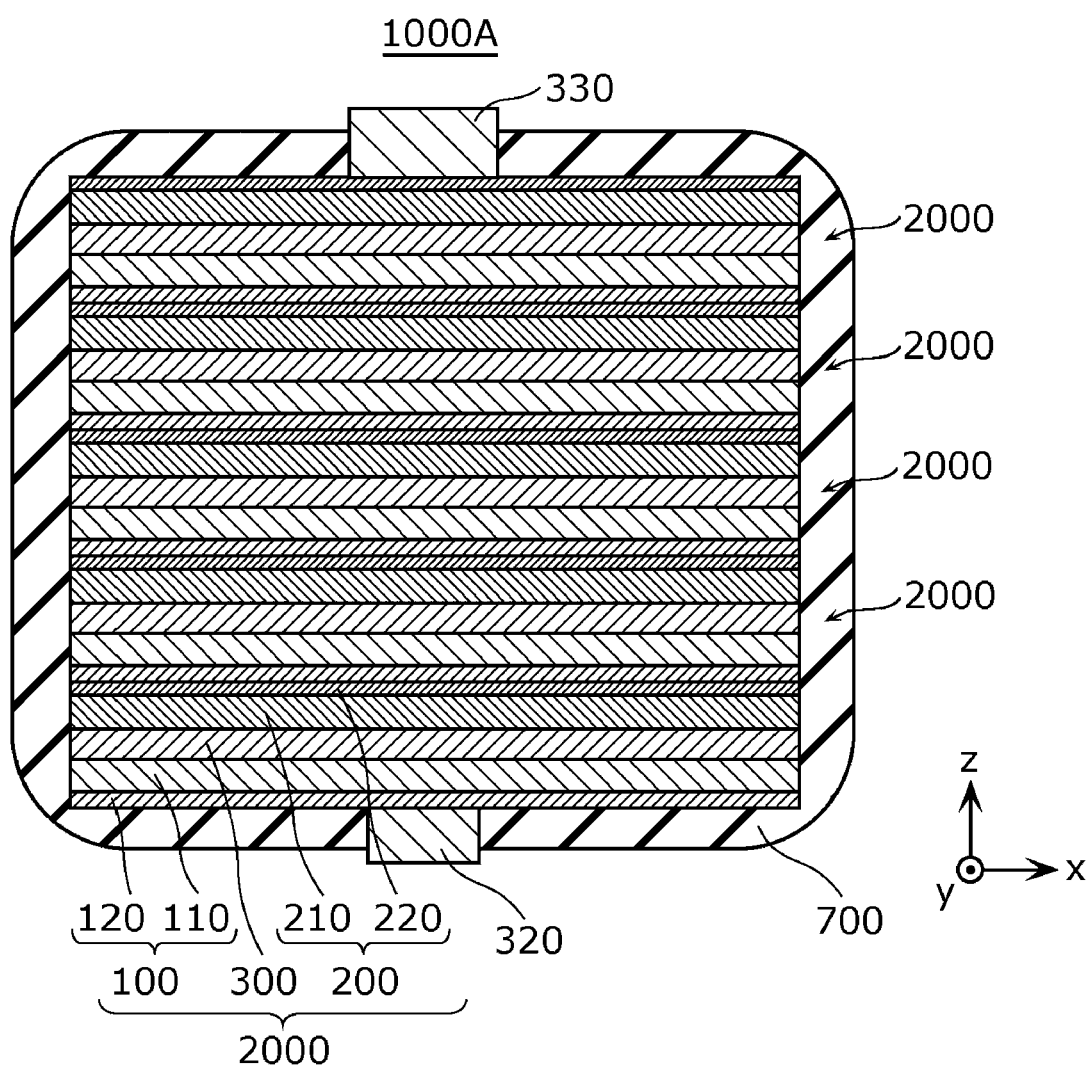
FIG. 2 is a cross-sectional view schematically showing a configuration of a laminated battery including a sealing member according to the embodiment.

Further, the laminated battery according to the present embodiment may further include a sealing member. FIG. 2 is a cross-sectional view schematically showing a configuration of a laminated battery 1000A including a sealing member 700 according to the present embodiment. As shown in FIG. 2, the laminated battery 1000A includes the sealing member 700, a negative-electrode collecting lead 320, and a positive-electrode collecting lead 330 in addition to the components of the aforementioned laminated battery 1000.

The negative-electrode collecting lead 320 and the positive-electrode collecting lead 330 are terminals, connected to the negative-electrode and positive-electrode collectors 120 and 220 of unit battery cells 2000 at both ends in the direction of laminating, respectively, through which a current is extracted from the laminated battery 1000A. Usable examples of a material that constitutes the negative-electrode collecting lead 320 and the positive-electrode collecting lead 330 include metals such as nickel, stainless steel, aluminum, and copper.

The sealing member 700 is disposed to cover all of the plurality of unit battery cells 2000 laminated. Parts of the negative-electrode collecting lead 320 and the positive-electrode collecting lead 330 are exposed without being covered with the sealing member 700. The sealing member 700 is made, for example, of an electrical insulating material.

For example, the sealing member 700 is a member containing a first material. The sealing member 700 may for example be a member containing the first material as a major ingredient. The sealing member 700 may for example be a member composed solely of the first material.

Usable examples of the first material include generally known battery sealing member materials such as sealants. Usable examples of the first material include resin materials. The first material may be an insulating material having no ion conductivity. For example, the first material may be at least one type of epoxy resin, acrylic resin, polyimide resin, and silsesquioxane.

The sealing member 700 may contain a particulate metal oxide material. Usable examples of the metal oxide material include silicon oxide, aluminum oxide, titanium oxide, zinc oxide, cerium oxide, ferric oxide, tungsten oxide, zirconium oxide, calcium oxide, zeolite, and glass. For example, the sealing member 700 may be made of a resin material containing a dispersion of a plurality of particles made of a metal oxide material.

The disposition of the sealing member 700 makes it possible to improve the reliability of the laminated battery 1000A in various respects such as mechanical strength, short-circuit prevention, and moisture prevention.

Modification

Next, a modification of the embodiment is described. The following description gives a description with a focus on differences from the foregoing embodiment and omits or simplifies a description of common features as appropriate.

Figure 3:
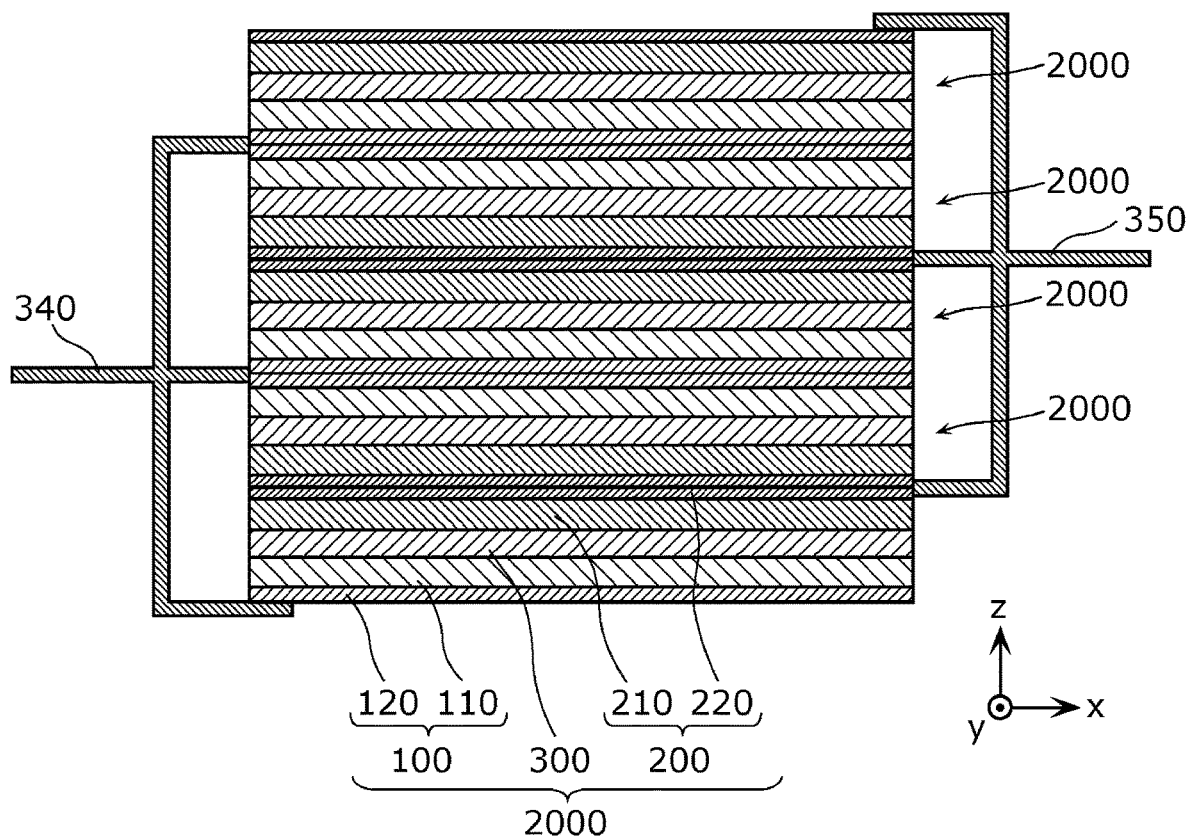
FIG. 3 is a cross-sectional view schematically showing a configuration of a laminated battery according to a modification of the embodiment.

FIG. 3 is a cross-sectional view schematically showing a configuration of a laminated battery 1100 according to the present modification. The laminated battery 1100 differs from the laminated battery 1000 according to the embodiment in that a plurality of unit battery cells 2000 are electrically connected in parallel to one another.

As shown in FIG. 3, the laminated battery 1100 according to the present modification includes the plurality of unit battery cells 2000. Specifically, the laminated battery 1100 has a structure in which the plurality of unit battery cells 2000 are laminated. The plurality of unit battery cells 2000 are electrically connected in parallel to one another to constitute the laminated battery 1100. Further, the laminated battery 1100 includes a negative-electrode collecting lead 340 and a positive-electrode collecting lead 350.

Adjacent ones of the plurality of unit battery cells 2000 are laminated with their electrodes in inverted orientation. That is, in the laminated battery 1100, the plurality of unit battery cells 2000 are laminated such that the negative-electrode or positive-electrode layers 100 or 200 of two adjacent unit battery cells 2000 are adjacent to each other. This causes the laminated battery 1100 to be a parallel-connected laminated battery in which the plurality of unit battery cells 2000 are electrically connected in parallel to one another.

In each of the unit battery cells 2000, the negative-electrode layer 100, the solid electrolyte layer 300, and the positive-electrode layer 200 are alternately laminated in this order or reverse order along a thickness direction (z-axis direction) of the unit battery cell 2000.

The negative-electrode collecting lead 340 and the positive-electrode collecting lead 350 are conducting wires that are used for charge and discharge, inter-terminal voltage monitoring, or other purposes. The negative-electrode collecting lead 340 is electrically connected to the negative-electrode collector 120 of the negative-electrode layer 100 of each of the plurality of unit battery cells 2000. The positive-electrode collecting lead 350 is electrically connected to the positive-electrode collector 220 of the positive-electrode layer 200 of each of the plurality of unit battery cells 2000.

The plurality of unit battery cells 2000 of the laminated battery 1100 shown in FIG. 3 are manufactured such that there are only small variations in the degree of compression and battery capacity of the unit battery cells 2000. The manufacturing method for reducing variations in degree of compression and battery capacity will be described later.

In the laminated battery 1100, each of the plurality of unit battery cells 2000 electrically connected in parallel to one another is at the same voltage as the other. Therefore, in a case where there are variations in the battery capacity of the plurality of unit battery cells 2000, there are great variations in current flowing through the negative-electrode collecting lead 340 and the positive-electrode collecting lead 350. On the other hand, in the laminated battery 1100 according to the present modification, there are only small variations in the respective battery capacities of the plurality of unit battery cells 2000. This makes it possible in the laminated battery 1100 to reduce the variations in current flowing through the negative-electrode collecting lead 340 and the positive-electrode collecting lead 350. This results in making it possible to prevent an excessive rise in temperature or other events, thus making it possible to reduce local heat generation of the unit battery cells 2000 and bringing about enhancement in reliability of the laminated battery 1100.

Further, the laminated battery according to the present modification may further include a sealing member. FIG. 4 is a cross-sectional view schematically showing a configuration of a laminated battery 1100A including a sealing member 700 according to the present modification. As shown in FIG. 4, the laminated battery 1100A includes the sealing member 700 in addition to the components of the aforementioned laminated battery 1100.

The sealing member 700 is disposed to cover all of the plurality of unit battery cells 2000 laminated. Parts of the negative-electrode collecting lead 340 and the positive-electrode collecting lead 350 are exposed without being covered with the sealing member 700.

The disposition of the sealing member 700 brings about effects which are similar to those of the aforementioned laminated battery 1000A.

Method for Manufacturing Laminated Battery

Next, a method for manufacturing a laminated battery according to the present embodiment is described. Although the following mainly describes a method for manufacturing a laminated battery 1000, a laminated battery 1100 too can be manufactured in a similar manner.

The method for manufacturing a laminated battery according to the present embodiment includes a laminated body forming step, an individual compressing step, a measuring step, a laminating step, and a collective compressing step. The following describes each of the steps in detail. FIG. 5 is a flow chart for explaining the method for manufacturing a laminated battery according to the present embodiment. It should be noted that the manufacturing method in the following description of the steps is just an example and is not limited to the following method.

(1) Laminated Body Forming Step

First, the laminated body forming step is described. In the method for manufacturing a laminated battery according to the present embodiment, the laminated body forming step is executed first. In the laminated body forming step, layers of material that constitute a unit battery cell 2000 are laminated to form a laminated body (step S11 of FIG. 5).

Figure 6A:
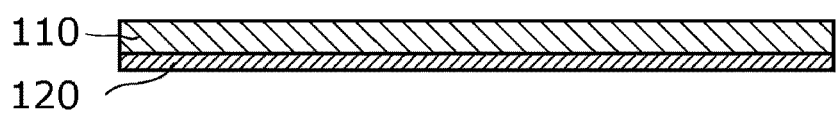
FIG. 6A is a cross-sectional view showing an example of a laminated configuration of a laminated body formed in a laminated body forming step according to the embodiment.
Figure 6B:
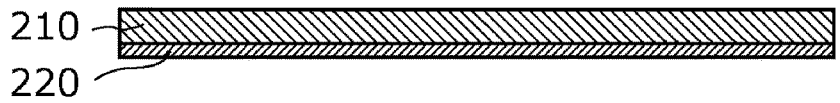
FIG. 6B is a cross-sectional view showing an example of a laminated configuration of a laminated body formed in the laminated body forming step according to the embodiment.

FIGS. 6A to 6H are cross-sectional views each showing an example of a laminated configuration of a laminated body formed in the laminated body forming step. In the laminated body forming step, for example, as shown in FIGS. 6A and 6B, a laminated body in which a negative-electrode active material layer 110 is laminated on top of a negative-electrode collector 120 and a laminated body in which a positive-electrode active material layer 210 is laminated on top of a positive-electrode collector 220 are formed.

Figure 6C:
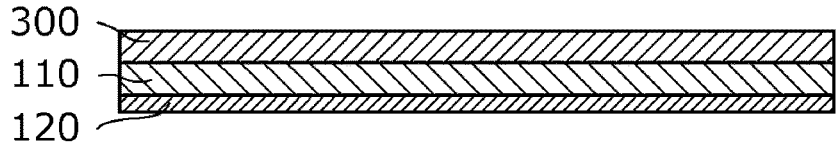
FIG. 6C is a cross-sectional view showing an example of a laminated configuration of a laminated body formed in the laminated body forming step according to the embodiment.
Figure 6D:
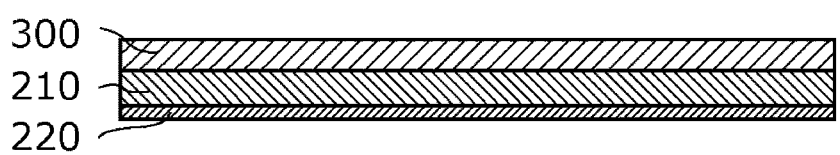
FIG. 6D is a cross-sectional view showing an example of a laminated configuration of a laminated body formed in the laminated body forming step according to the embodiment.

Further, as shown in FIGS. 6C and 6D, a laminated body in which a solid electrolyte layer 300 is laminated on top of the negative-electrode active material layer 110 of the laminated body shown in FIG. 6A and a laminated body in which a solid electrolyte layer 300 is laminated on top of the positive-electrode active material layer 210 of the laminated body shown in FIG. 6B may be formed.

Figure 6E:
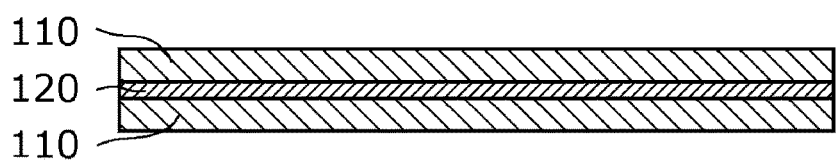
FIG. 6E is a cross-sectional view showing an example of a laminated configuration of a laminated body formed in the laminated body forming step according to the embodiment.
Figure 6F:
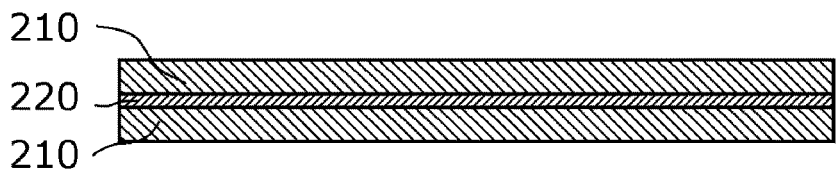
FIG. 6F is a cross-sectional view showing an example of a laminated configuration of a laminated body formed in the laminated body forming step according to the embodiment.

Further, as shown in FIGS. 6E and 6F, a laminated body in which negative-electrode active material layers 110 are laminated on both sides of a negative-electrode collector 120 and a laminated body in which positive-electrode active material layers 210 are laminated on both sides of a positive-electrode collector 220 may be formed.

Figure 6G:
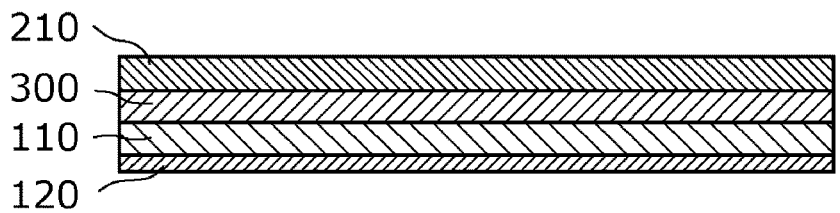
FIG. 6G is a cross-sectional view showing an example of a laminated configuration of a laminated body formed in the laminated body forming step according to the embodiment.
Figure 6H:
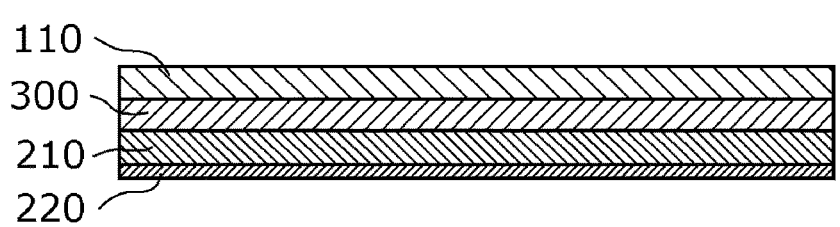
FIG. 6H is a cross-sectional view showing an example of a laminated configuration of a laminated body formed in the laminated body forming step according to the embodiment.

Further, as shown in FIG. 6G, a laminated body in which a positive-electrode active material layer 210 is laminated on top of the solid electrolyte layer 300 of the laminated body shown in FIG. 6C may be formed. Further, as shown in FIG. 6H, a laminated body in which a negative-electrode active material layer 110 is laminated on top of the solid electrolyte layer 300 of the laminated body shown in FIG. 6D may be formed. It should be noted that the laminated bodies shown in FIGS. 6A to 6H are just a few examples and the laminated configuration of a laminated body is not limited to the examples shown in FIGS. 6A to 6H. For example, a laminated body may be identical in laminated configuration to a unit battery cell 2000.

The aforementioned laminated bodies may each be formed, for example, by coating a collector or a surface of each layer with a paste of paint containing a mixture of the respective materials of the negative-electrode active material layer 110, the positive-electrode active material layer 210, and the solid electrolyte layer 300 and a solvent and drying the paste of paint. Further, the laminated bodies thus formed may be compressed in the direction of laminating.

The compression is not limited to particular methods. Plate pressing, roller pressing, pneumatic or gas-pressure bag pressing, hydrostatic pressing, or other various methods may be applied.

(2) Individual Compressing Step

Next, the individual compressing step is described. In the individual compressing step, laminated bodies formed in the laminated body forming step are combined on an as-needed basis and compressed to form a plurality of unit battery cells of different degrees of compression (step S12 of FIG. 5). The plurality of unit battery cells of different degrees of compression thus formed are unit battery cells that are laminated in the after-mentioned laminating step.

In the individual compressing step, for example, at least two of the laminated bodies shown in FIGS. 6A to 6H are laminated such that the negative-electrode active material layer 110 and the positive-electrode active material layer 210 face each other across the solid electrolyte layer 300. In so doing, the at least two laminated bodies are laminated with any of the negative-electrode active material layer 110, the solid electrolyte layer 300, and the positive-electrode active material layer 210 and any of the negative-electrode active material layer 110, the solid electrolyte layer 300, and the positive-electrode active material layer 210 facing each other, and the laminated bodies are compressed and joined to each other by compressing them in the direction of laminating. Further, in a case where the laminated bodies include all layers of a unit battery cell, the laminated bodies may be compressed in the direction of laminating without being combined with each other.

Figure 7A:
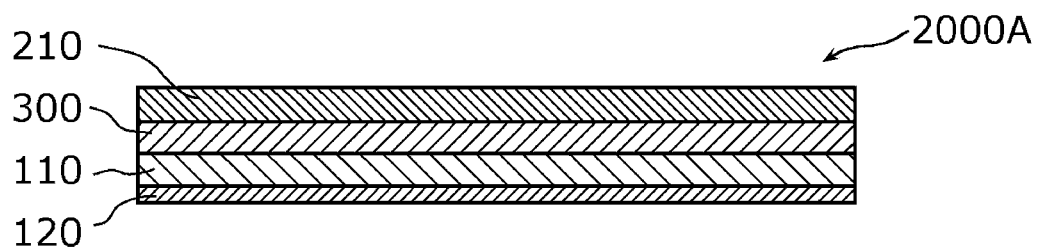
FIG. 7A is a cross-sectional view showing an example of a laminated configuration of a unit battery cell formed in an individual compressing step according to the embodiment.
Figure 7B:
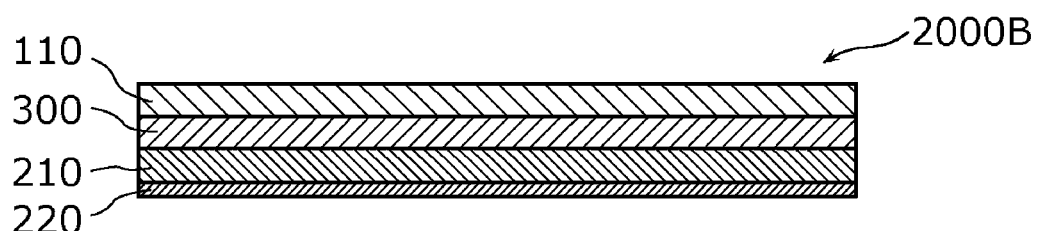
FIG. 7B is a cross-sectional view showing an example of a laminated configuration of a unit battery cell formed in the individual compressing step according to the embodiment.
Figure 7C:
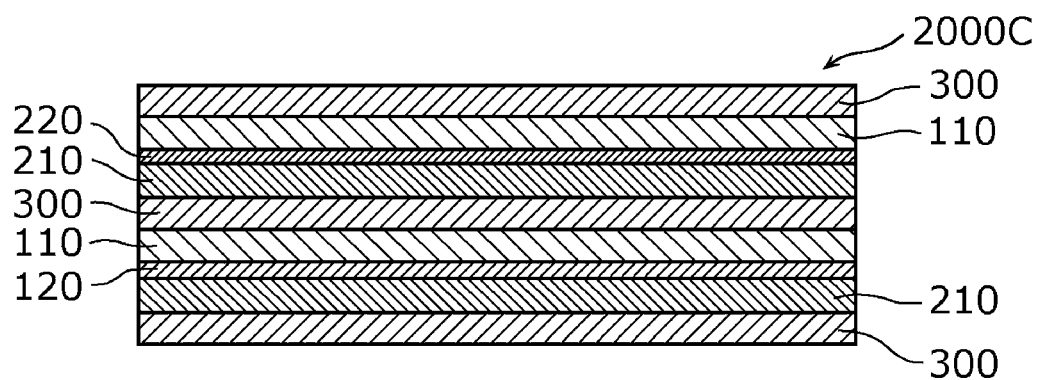
FIG. 7C is a cross-sectional view showing an example of a laminated configuration of a unit battery cell formed in the individual compressing step according to the embodiment.

It should be noted that the laminated configuration of a laminated battery cell that is formed in the individual compressing step is not limited to the laminated configuration of a unit battery cell 2000. FIGS. 7A to 7C are cross-sectional views each showing an example of a laminated configuration of a unit battery cell formed in the individual compressing step according to the embodiment. As shown in FIGS. 7A and 7B, in a case where the laminated bodies shown in FIGS. 6G and 6H are used, the laminated bodies may be compressed in the direction of laminating without being combined with another particular laminated body to form a unit battery cell 2000A or 2000B constituted by a negative-electrode active material layer 110, a solid electrolyte layer 300, and either a positive-electrode active material layer 210 and a negative-electrode collector 120 or a positive-electrode active material layer 210 and a positive-electrode collector 220. Further, as shown in FIG. 7C, a unit battery cell 2000C configured such that active material layers are laminated on both sides of each of two collectors and solid electrolyte layers 300 are laminated on sides of the active material layers opposite to the collectors may be formed. Further, either of the solid electrolyte layers 300 located at both ends of the unit battery cell 2000C in the direction of laminating does not need to be laminated. Further, the unit battery cells shown in FIGS. 7A to 7C are just a few example, and the laminated configuration of a unit battery cell is not limited to the examples shown in FIGS. 7A to 7C. For example, a unit battery cell that is formed in the individual compressing step is not limited to a unit battery cell including all of a negative-electrode layer 100, a positive-electrode layer 200, and a solid electrolyte layer 300. A unit battery cell that is formed in the individual compressing step may be a unit battery cell including at least any of a negative-electrode layer 100, a positive-electrode layer 200, and a solid electrolyte layer 300.

The compression in the individual compressing step is not limited to particular methods. Plate pressing, roller pressing, pneumatic or gas-pressure bag pressing, hydrostatic pressing, or other various methods may be applied.

In the individual compressing step, a plurality of unit battery cells of different degrees of compression are formed. In the individual compressing step, the plurality of unit battery cells that are formed may be all different in degree of compression from one another or may include unit battery cells of the same degree of compression. The term "degree of compression" means a degree, measured by the after-mentioned measurement of mechanical characteristics, to which layers of material that constitute a unit battery cell are compressed. For example, the degree of compression becomes higher, for example, as an air gap between layers of powder material that constitute the unit battery cell becomes smaller and the compression joining of the layers progresses.

In the individual compressing step, the degree of compression of a unit battery cell can be adjusted, for example, by adjusting the pressure that compresses laminating bodies in forming the unit battery cell. FIG. 8 is a diagram for explaining an example of adjustment of the degrees of compression of unit battery cells in the individual compressing step. In the individual compressing step, as shown in (a), (b), and (c) of FIG. 8, laminated bodies designed to be identical in material, shape, or other respects to one another are compressed by varied compressing pressures. Specifically, the laminated bodies shown in (a), (b), and (c) of FIG. 8 are compressed by the lowest compressing pressure, the second highest compressing pressure, and the highest compressing pressure, respectively. Compressing the laminated bodies shown in (a), (b), and (c) of FIG. 8 results in the formation of a plurality of unit battery cells 2001, 2002, and 2003 shown in (d), (e), and (f) of FIG. 8, respectively. That is, a plurality of unit battery cells 2001, 2002, and 2003 of different degrees of compression corresponding to the differences among the pressures that compress the laminated bodies are obtained. Specifically, the unit battery cells 2001, 2002, and 2003 are lowest, second highest, and highest in degree of compression, respectively. Further, for example, of the plurality of unit battery cells 2001, 2002, and 2003, the unit battery cell 2001 is lowest in degree of compression and therefore greatest in thickness, and the unit battery cell 2003 is highest in degree of compression and therefore smallest in thickness. The laminated bodies shown in (a), (b), and (c) of FIG. 8 and the unit battery cells 2001, 2002, and 2003 shown in (d), (e), and (f) of FIG. 8 are each identical in laminated configuration to the aforementioned unit battery cells 2000.

In the individual compressing step, the method for adjusting the degree of compression of a unit battery cell is not limited to adjusting the pressure that compresses laminated bodies in forming the unit battery cell. The degree of compression of a unit battery cell can be adjusted, for example, by the settings of gaps in which the compression is performed, the duration of the compression, the temperature at which the compression is performed.

Further, in a case where a laminated body is compressed in the aforementioned laminated body forming step, the degree of compression of a unit battery cell can also be adjusted by adjusting compression conditions in the laminated body forming step as mentioned above.

In the laminated body forming step and the individual compressing step, for example, as many unit battery cells as needed for the laminated battery 1000 are formed.

In the present embodiment, there is no particular limit on how a unit battery cell is formed, provided a unit battery cell that constitutes a laminated battery is formed. A unit battery cell may be formed by a step other than the aforementioned two steps.

(3) Measuring Step

Next, the measuring step is described. In the measuring step, the respective characteristics of the plurality of unit battery cells are measured (step S13 of FIG. 5). Specifically, in the measuring step, characteristics for checking the respective degrees of compression of the plurality of unit battery cells are measured. For example, the characteristics measured in the measuring step are used for determining the order in which the plurality of unit battery cells are laminated in the after-mentioned laminating step.

Further, the characteristics measured in the measuring step may also be used in the individual compressing step to adjust the degrees of compression of the unit battery cells. That is, in the individual compressing step, the respective degrees of compression of the plurality of unit battery cells are adjusted on the basis the characteristics measured in the measuring step. For example, in a case where the characteristics of the unit battery cells formed in the individual compressing step are measured and the characteristics thus measured do not fall within a predetermined range of value, the unit battery cells are compressed again, and the compression and characteristics measurement of the unit battery cells are repeated until the characteristics fall within the predetermined range of value. That is, the individual compressing step (i.e. step S12) and the measuring step (i.e. step S13) are repeatedly executed. Further, for example, during the compression of the unit battery cells in the individual compressing step, the characteristics of the unit battery cells are repeatedly measured, and the compression is ended in a case where the characteristics thus measured have come to fall within the predetermined range of value. That is, the measuring step (i.e. step S13) is repeatedly executed during the individual compressing step (i.e. step S12). The predetermined range of value is set, for example, according to how high and precise the degrees of compression of the unit battery cells are intended to be. This increases the precision of the respective degrees of compression of the plurality of unit battery cells to be laminated in the laminating step, making it possible to reduce variations in the degree of compression of the plurality of unit battery cells 2000 of the laminated battery 1000 to be manufactured.

In the measuring step, for example, the respective mechanical characteristics or electrical characteristics of the plurality of unit battery cells are measured as the characteristics.

In the measuring step, for example, mechanical deformation amounts, densities, hardness, or other characteristics are measured as the mechanical characteristics. Such mechanical characteristics can be used as indices that indicate the degrees of compression of the unit battery cells, making it possible to directly check the degrees of compression of the unit battery cells. Specifically, increases in mechanical deformation amount, density, and hardness lead to increases in degree of compression of the unit battery cells. In a case where mechanical deformation amounts are measured as the mechanical characteristics in the measuring step, the amounts of deformation of the unit battery cells in the thickness direction are measured, for example, by a contact displacement meter, an optical displacement meter, or a gap gauge. Measuring mechanical displacement amounts in this way makes it possible to carry out measurements while compressing the unit battery cells, thus making it possible to shorten the processing time.

Further, for example, electrical characteristics for deriving the battery capacities of the unit battery cells are measured as the electrical characteristics in the measuring step. The battery capacities of the unit battery cells increase as the degrees of compression become higher with progress in compression joining of the unit battery cells. Therefore, in the measuring step, the degrees of compression of the unit battery cells can be checked by estimating the degrees of compression of the unit battery cells on the basis of results of measurements of the electrical characteristics for deriving the battery capacities of the unit battery cells. As the electrical characteristics, charge and discharge characteristics in a fully charged condition that make it possible to directly derive the battery capacities may be measured, or the battery capacities may be derived by measuring electrical characteristics correlated to the battery capacities and estimating the battery capacities. The battery capacities are quantities of electricity in a fully charged condition.

The measurement of the electrical characteristics can involve the use of, for example, impedance measurement, charge and discharge electrical characteristics measurement, or other measurements. That is, in the measuring step, the respective impedances or charge and discharge characteristics of the plurality of unit battery cells may be measured as the electrical characteristics.

In the impedance measurement, the impedance of a unit battery cell having a higher battery capacity tends to be lower. Further, progress in compression joining of a unit battery cell leads to an increase in battery capacity of the unit battery cell and leads to a decrease in impedance of the unit battery cell. This is used to estimate the battery capacity of a unit battery cell by measuring the impedance.

For example, a plurality of test unit battery cells of different battery capacities are prepared by preparing a plurality of test unit battery cells of different degrees of compression. As the test unit battery cells, unit battery cells that are identical in material and laminated configuration to unit battery cells that constitute a laminated battery to be manufactured are prepared. Then, a correlation between battery capacity and impedance is acquired by measuring the battery capacity and impedance of each of the plurality of test unit battery cells thus prepared. This makes it possible to, by measuring the impedances of the unit battery cells in the measuring step, estimate the degrees of compression and battery capacities of the unit battery cells from the impedances thus measured and the correlation thus acquired. This makes it possible to manufacture the laminated battery 1000 with high producibility, as the degrees of compression of the unit battery cells can be checked simply by measuring the impedances of the unit battery cells.

It should be noted that the aforementioned method is not the only method for preparing test unit battery cells of different battery capacities. For example, a plurality of test unit battery cells of different battery capacities may be prepared by preparing a plurality of unit battery cells made of the same material with varying areas or thicknesses.

In the measurement of the charge and discharge characteristics, the battery capacities are derived from the quantities of charging and discharging electricity, for example, by measuring the charge and discharge characteristics with the unit battery cells fully charged.

Figure 9:
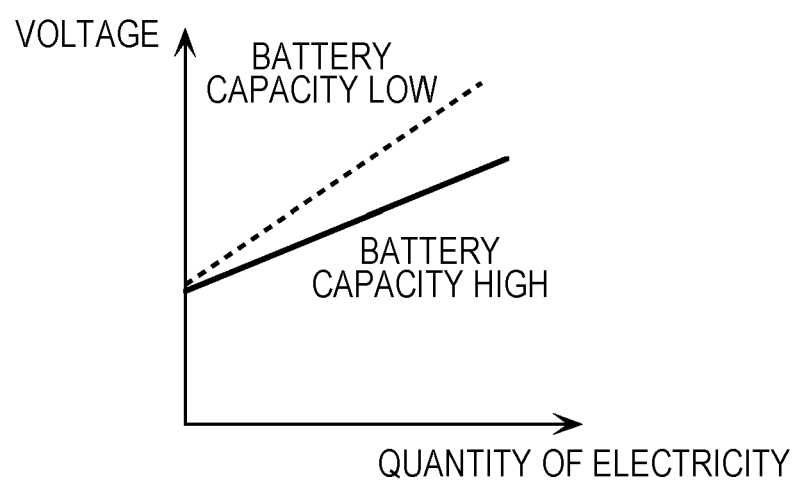
FIG. 9 is a schematic view showing a relationship between quantity of charging electricity and voltage at an early stage of charging of a unit battery cell according to the embodiment.

Further, the charge and discharge characteristics may be measured by measuring the rising characteristics of voltage of the unit battery cells with respect to the quantities of charging electricity at an early stage of charging where the unit battery cells are charged with a constant current (i.e. at a constant charge and discharge rate). In such measurement too, the battery capacities can be estimated. FIG. 9 is a schematic view showing a relationship between quantity of charging electricity and voltage at an early stage of charging of a unit battery cell. FIG. 9 shows the voltage (vertical axis) and the quantity of charging electricity (horizontal axis) in a case where the unit battery cell is charged with a constant current. In FIG. 9, the dotted line indicates a case where the battery capacity of the unit battery cell is relatively low, and the solid line indicates a case where the battery capacity of the unit battery cell 2000 is relatively high. As shown in FIG. 9, in a case where the battery capacity of the unit battery cell is low, the rise in voltage at the early stage of charging is large, and in a case where the battery capacity of the unit battery cell is high, the rise in voltage at the early stage of charging is small. That is, in the case of unit battery cells 2000 that are similar or identical in material and shape, a unit battery cell with a larger rise in voltage per unit time in a short time of approximately several seconds to several minutes after an early stage of charging where the unit battery cell is charged with a constant current exhibits a correlation with a lower battery capacity in a fully charged condition. This is used to estimate the battery capacity of a unit battery cell through the short-time charge and discharge characteristics measurement.

For example, as in the case of the aforementioned impedance measurement, a plurality of test unit battery cells of different battery capacities are prepared. Then, a correlation between battery capacity and amount of short-time rise in voltage per unit time is acquired by measuring the battery capacity and amount of short-time rise in voltage per unit time of each of the plurality of test unit battery cells thus prepared. This makes it possible to, by measuring the short-time charge and discharge characteristics of the unit battery cells, estimate the degrees of compression and battery capacities of the unit battery cells from the amounts of rise in per unit time thus measured and the correlation thus acquired. This makes it possible to check the degrees of compression of the unit battery cells even in a short time, thus allowing a rapid shift to a next step in manufacturing a laminated battery. This makes it possible to manufacture the laminated battery 1000 with high producibility. Further, since a small quantity of electricity is charged, only a small amount of current flows even at the occurrence of a short circuit or other failures due to contact between a negative-electrode layer 100 and a positive-electrode layer 200 during the manufacture, so that heat generation or other events are reduced. This makes it possible to enhance the safety with which the laminated battery 1000 is manufactured.

Further, in the acquisition of a correlation between battery capacity and amount of short-time rise in voltage per unit time, correlations at different charge and discharge rates may be acquired by measuring the charge and discharge characteristics of a plurality of test unit battery cells under a plurality of conditions with different charge and discharge rates (i.e. amounts of current during charging and discharging). From among the charge and discharge rates thus measured, a charge and discharge rate most suitable for the measurement of the charge and discharge characteristics may be chosen from the point of view of correlativity, the duration of measurement, or other conditions. Further, for higher accuracy of estimate of the battery capacities of the unit battery cells, the charge and discharge characteristics of the unit battery cells may be measured at a plurality of charge and discharge rates.

In the short-time charge and discharge characteristics measurement, for example, the charge and discharge characteristics are measured in a region lower than or equal to 10% of the battery capacities of the plurality of unit battery cells. From the point of view of carrying out a measurement in a shorter time, the charge and discharge characteristics may be measured in a region lower than or equal to 5%, 2%, or 1% of the battery capacities of the plurality of unit battery cells. Further, from the point of view of being able to manufacture the laminated battery 1000 with high producibility, the duration of measurement of the charge and discharge characteristics is for example shorter than or equal to one minute. Further, from the point of view of being able to manufacture the laminated battery 1000 with higher producibility, the duration of measurement of the charge and discharge characteristics may be shorter than or equal to thirty seconds, shorter than or equal to ten seconds, or shorter than or equal to three seconds.

Further, in the short-time charge and discharge characteristics measurement, a discharge may be made after the amount of rise in voltage at the early stage of charging has been checked. Further, in a case where the charge and discharge characteristics are measured in a short time, it is possible to proceed to a next manufacturing step without making a discharge, as only a small amount of current flows even if no discharge is made after charging. Further, in a case where a discharge is made, the amount of drop in voltage due to the discharge may be checked.

(4) Laminating Step and Collective Compressing Step

Next, the laminating step and the collective compressing step are described. In the laminating step, the plurality of unit battery cells of different degrees of compression are laminated in an order of laminating adjusted on the basis of the respective degrees of compression of the plurality of unit battery cells (step S14 of FIG. 5). Specifically, the plurality of unit battery cells are laminated in such an arrangement that two unit battery cells located at both ends in the direction of laminating are both lower in degree of compression than a unit battery cell located between the two unit battery cells. The order of laminating of the plurality of unit battery cells is determined, for example, on the basis of the characteristics measured in the measuring step. Next, in the collective compressing step, the plurality of unit battery cells laminated in the laminating step are compressed in the direction of laminating (step S15 of FIG. 5).

FIG. 10 is a diagram for explaining the laminating step and the collective compressing step. FIG. 10 shows a case where a laminated battery 1000 including in which a plurality of unit battery cells 2000 are laminated is manufactured by executing the laminating step and the collective compressing step with the plurality of unit battery cells 2001, 2002, and 2003 shown in FIG. 8. Further, for simplicity of illustration, FIG. 10 does not illustrate a laminated configuration of layers but uses a dot-patterned rectangle to indicate each of the unit battery cells 2000, 2001, 2002, and 2003. The unit battery cells 2000, 2001, 2002, and 2003 are patterned with dots such that a higher density in number of dots means a higher degree of compression. Therefore, the unit battery cells 2001, 2002, 2003, and 2000 are lowest, third highest, second highest, and highest in degree of compression, respectively.

First, in the laminating step, as shown in (a) of FIG. 10, the plurality of unit battery cells 2001, 2002, and 2003 of different degrees of compression formed in the individual compressing step are laminated. Specifically, the unit battery cells 2001, which are lowest in degree of compression, are disposed at both ends in the direction of laminating or, in (a) of FIG. 10, at upper and lower ends, respectively, and the unit battery cell 2003, which is highest in degree of compression, is disposed between the two unit battery cells 2001, i.e. closer to the center in the direction of laminating. Further, the unit battery cells 2002, which are higher in degree of compression than the unit battery cells 2001 but lower in degree of compression than the unit battery cell 2003, are disposed between the unit battery cells 2001 and the unit battery cell 2003. In the illustrated example, five unit battery cells are laminated. However, the number of unit battery cells that are laminated is not limited to a particular number. The number of unit battery cells that are laminated may be larger than or equal to 2 and smaller than or equal to 4 or may be larger than or equal to 6.

Next, in the collective compressing step, the plurality of unit battery cells 2001, 2002, and 2003 laminated as shown in (a) of FIG. 10 are compressed in the direction of laminating. In the collective compressing step, the pressure by which the plurality of unit battery cells 2001, 2002, and 2003 thus laminated are compressed in the direction of laminating acts most strongly on the unit battery cells 2001, which are disposed at both ends in the direction of laminating, and acts most weakly on the unit battery cell 2003, which is disposed at the center in the direction of laminating. Further, on the unit battery cells 2002, which are disposed between the unit battery cells 2001 and the unit battery cell 2003, the pressures between the unit battery cells 2001 and the unit battery cell 2003 act. Therefore, compressing the plurality of unit battery cells 2001, 2002, and 2003 after laminating them in the order of laminating shown in (a) of FIG. 10 makes it possible to obtain a laminated battery 1000 composed of unit battery cells 2000 with small variations in degree of compression by making the respective degrees of compression of the unit battery cells 2000 thus compressed uniform as shown in (b) of FIG. 10. In this way, adjusting the order of laminating of the plurality of unit battery cells 2001, 2002, and 2003 of different degrees of compression makes it possible to make the degrees of compression of the unit battery cells 2000 equal to or higher than that of the unit battery cell 2003 and reduce variations in the respective degrees of compression of the unit battery cells 2000.

Further, in the example shown in FIG. 10, in the laminating step, the plurality of unit battery cells are laminated in such an arrangement that of adjacent unit battery cells 2001 and 2002, the unit battery cell 2001, which is located closer to an end in the direction of laminating, is smaller in degree of compression than or equal in degree of compression to the unit battery cell 2002. Further, the plurality of unit battery cells are laminated in such an arrangement that of adjacent unit battery cells 2002 and 2003, the unit battery cell 2002, which is located closer to an end in the direction of laminating, is smaller in degree of compression than or equal in degree of compression to the unit battery cell 2003. That is, the plurality of unit battery cells 2001, 2002, and 2003 are laminated in such an arrangement that one unit battery cell located closer to an end in the direction of laminating is smaller in degree of compression than or equal in degree of compression to the other unit battery cell. This causes the unit battery cells 2001, 2002, and 2003 to be laminated in such an arrangement that the degree of compression of a unit battery cell located closer to the center in the direction of laminating is lower than the degree of compression of a unit battery cell located closer to either end in the direction of laminating so that increases in degree of compression by the action of the compressing pressure in the collectively compressing are canceled out, although the action becomes stronger from the center toward either end in the direction of laminating. This makes it possible to further reduce the variations in the degree of compression of the unit battery cells 2000 after the collective compressing step. For example, the respective degrees of compression of the unit battery cells 2000 can be made substantially uniform.

Further, in the laminating step, in a case where as in the case of a unit battery cell 2001, 2002, and 2003, collectors are disposed at both ends of a unit battery cell in the direction of laminating, the plurality of unit battery cells are laminated such that their collectors face each other. In the case of manufacture of the series-connected laminated battery 1000, adjacent unit battery cells are laminated such that the negative-electrode collector 120 of one of the adjacent unit battery cells and the positive-electrode collector 220 of the other of the adjacent unit battery cells face each other. That is, the plurality of unit battery cells are laminated such that the negative-electrode layer 100 of one of adjacent unit battery cells and the positive-electrode layer 200 of the other of the adjacent unit battery cells are adjacent to each other. Further, in the case of manufacture of the parallel-connected laminated battery 1100, adjacent unit battery cells are laminated such that the negative-electrode or positive-electrode collectors 120 or 220 of the adjacent unit battery cells face each other. That is, the plurality of unit battery cells are laminated such that the negative-electrode or positive-electrode layers 100 or 200 of two adjacent unit battery cells are adjacent to each other.

Further, for example, adjacent unit battery cells 2000 may be laminated with an conductive material sandwiched therebetween so that their collectors are electrically connected to each other. Usable examples of the conductive material include metal, conductive resin, and electrically-conducting adhesive. In a case where adjacent unit battery cells are joined by an conductive material, a stronger laminated structure of unit battery cells can be formed.

Further, in the laminating step, in a case where as in the case of the unit battery cells 2000A and 2000B shown in FIGS. 7A and 7B, a collector and an active material layer are disposed at both ends of a unit battery cell in the direction of laminating, adjacent unit battery cells may be laminated such that the active material layer of one of the adjacent unit battery cells and the collector of the other of the adjacent unit battery cells face each other.

Further, in the laminating step, in a case where as in the case of the unit battery cell 2000C shown in FIG. 7C, solid electrolyte layers 300 are disposed at both ends of a unit battery cell in the direction of laminating or a solid electrolyte layer 300 and an active material layer are disposed at both ends, adjacent unit battery cells may be laminated such that the solid electrolyte layer 300 of one of the adjacent unit battery cells and the active material layer or solid electrolyte layer 300 of the other of the adjacent unit battery cells face each other.

A laminated battery can also be manufactured by laminating such unit battery cells 2000A, 2000B, or 2000C and further laminating missing collectors or active material layers as needed.

Finally, if necessary, the laminated battery thus obtained is fitted with leads, a sealing member, an exterior, or other components in a step of finishing the laminated battery (step S16 of FIG. 5). It should be noted that the laminated battery may be further compressed after step S16.

As noted above, a method for manufacturing a laminated battery according to the present embodiment is a method for manufacturing a laminated battery 1000 in which a plurality of unit battery cells 2000 each having a negative-electrode layer 100, a positive-electrode layer 200, and a solid electrolyte layer 300 located between the negative-electrode layer 100 and the positive-electrode layer 200 are laminated. The method for manufacturing a laminated battery includes a laminating step and a collective compressing step. In the laminating step, a plurality of unit battery cells 2001, 2002, and 2003 are laminated. In the collective compressing step, the plurality of unit battery cells 2001, 2002, and 2003 laminated in the laminating step are compressed in a direction of laminating. In the laminating step, the plurality of unit battery cells 2001, 2002, and 2003 are laminated in such an arrangement that two unit battery cells 2001 located at both ends in the direction of laminating are both lower in degree of compression than a unit battery cell 2003 located between the two unit battery cells 2001.

In the collective compressing step, the compressing pressure acts more strongly on the unit battery cells located closer to both end in the direction of laminating. Therefore, compressing unit battery cells of the same degree of compression causes variations in the degree of compression of the unit battery cells. This results in great variations in the battery capacity of the unit battery cells. In the laminated battery 1000, a current of the same magnitude flows through each of the plurality of unit battery cells 2000 electrically connected in series to one another. Therefore, in a case where there are variations in the battery capacity of the plurality of unit battery cells 2000, the unit battery cells 2000 become over-charged and over-discharged. Further, in the laminated battery 1100, each of the plurality of unit battery cells 2000 electrically connected in parallel to one another is at the same voltage as the other. Therefore, in a case where there are variations in the batter y capacity of the plurality of unit battery cells 2000, there are great variations in current flowing through the negative-electrode collecting lead 340 and the positive-electrode collecting lead 350.

On the other hand, in the method for manufacturing a laminated battery according to the present embodiment, the plurality of unit battery cells 2001, 2002, and 2003 are laminated such that the unit battery cells 2001, which are lower in degree of compression than the unit battery cell 2003, which is located closer to the center in the direction of laminating, are located at both ends in the direction of laminating. Thus, in the collective compressing step, the pressure that compresses the unit battery cells 2001, which are relatively low in degree of compression, acts relatively strongly, and the pressure that compresses the unit battery cell 2003, which is relatively high in degree of compression, acts relatively weakly. Since the plurality of unit battery cells 2001, 2002, and 2003 of different degrees of compression are laminated in the aforementioned arrangement, variations in the degree of compression of the unit battery cells caused by the differences in action of the compressing pressures in the collective compressing step can be canceled out. This makes it possible to reduce variations in the degree of compression of a plurality of unit battery cells 2000 to be formed after the collective compressing step. Further, the battery capacity becomes higher as the compression joining of a unit battery cell progresses and the degree of compression becomes higher. This makes it possible to also reduce variations in the battery capacity of the unit battery cells by reducing the variations in the degree of compression of the plurality of unit battery cells.

This results in making it possible to, in a case where the series-connected laminated battery 1000 is manufactured, inhibit each of the plurality of unit battery cells 2000, for example, from being over-charged or over-discharged. Further, in a case where the parallel-connected laminated battery 1100 is manufactured, variations in current flowing through collecting leads through which a current is extracted from electrodes can be reduced. This makes it possible to reduce local heat generation of the unit battery cells 2000 attributed to an excessive rise in temperature or other factors due to the flow of an excess current. Therefore, the method for manufacturing a laminated battery according to the present embodiment makes it possible to reduce unsafe events such as degradation and heat generation of the unit battery cells 2000, making it possible to manufacture a laminated battery with enhanced reliability.

OTHER EMBODIMENTS

In the foregoing, a laminated battery according to the present disclosure has been described with reference to embodiments; however, the present disclosure is not intended to be limited to these embodiments. Applications to the present embodiments of various types of modification conceived of by persons skilled in the art and other embodiments constructed by combining some constituent elements of the embodiments are encompassed in the scope of the present disclosure, provided such applications and embodiments do not depart from the spirit of the present disclosure.

For example, although, in the foregoing embodiment, the laminated battery is a series-connected or parallel-connected laminated battery, this is not intended to impose any limitation. The laminated battery may be a combination of series-connected and parallel-connected laminated batteries laminated such that the positive-electrode or negative electrode layers of the series-connected laminated battery are electrically connected to each other.

Further, although, in the foregoing embodiment, the plurality of unit battery cells are separately formed by laminating and compressing layers of each of the unit battery cells, this is not intended to impose any limitation. For example, the plurality of unit battery cells may be formed by forming a unit battery cell of a size that can be divided into two or more and dividing the unit battery cell.

Further, the foregoing embodiments are subject, for example, to various changes, substitutions, additions, and omissions in the scope of the claims or the scope of equivalents thereof.

A laminated battery according to the present disclosure may be used as a battery for an electronic device, an electrical appliance, and an electric vehicle.

What is claimed is:

1. A method for manufacturing a laminated battery, comprising:
forming a plurality of unit battery cells each having a negative-electrode layer, a positive-electrode layer, and a solid electrolyte layer located between the negative-electrode layer and the positive-electrode layer are laminated, wherein
each unit battery cell of the plurality of unit battery cells is formed by laminating the solid electrolyte layer between the negative-electrode layer and the positive-electrode layer, the plurality of unit battery cells being formed includes at least:
- a first unit battery cell having a first degree of compression,
- a second unit battery cell having a second degree of compression, wherein the second degree of compression is lower than the first degree of compression, and
- a third unit battery cell having a third degree of compression, wherein the third degree of compression is lower than the first degree of compression;

laminating the plurality of unit battery cells in an arrangement that comprises the first unit battery cell being located between the second unit battery cell and the third unit battery cell to form a laminated plurality of unit cells; and collectively compressing, in a direction of laminating, the laminated plurality of unit cells.

2. The method according to claim 1, wherein
the first unit battery cell is a first individually compressed unit battery cell having the first degree of compression,
the second unit battery cell is a second individually compressed unit battery having the second degree of compression, and
the third unit battery cell is a third individually compressed unit battery cell having the second degree of compression; and
prior to the laminating that results in the formation of the laminated plurality of unit cells, the forming of the plurality of unit battery cells comprises:
- individually compressing, in the direction of laminating, the first unit battery cell to form the first individually compressed unit battery cell with the first degree of compression,
- individually compressing, in the direction of laminating, the second unit battery cell to form the second individually compressed unit battery cell with the second degree of compression, and
- individually compressing, in the direction of laminating, the third unit battery cell to form the third individually compressed unit battery cell with the first degree of compression.

3. The method according to claim 2, further comprising measuring respective mechanical quantities and/or electrical quantities of the first, second and/or third individually compressed unit battery cells, and
during the individually compressing, adjusting the respective degrees of compression of the first, second and/or third individually compressed unit battery cells based on the mechanical and/or electrical quantities measured in the measuring.

4. The method according to claim 3, wherein in the measuring, the respective electrical quantities of the first, second and third individually compressed unit battery cells are measured.

5. The method according to claim 4, wherein the measuring the respective electrical quantities comprises:
measuring respective charge and discharge characteristics of the first, second and third individually compressed unit battery cells.

6. The method according to claim 5, wherein the measuring of the respective charge and discharge characteristics comprises:
measuring charge and discharge characteristics in a region lower than or equal to 10% of the battery capacities of the first, second and third individually compressed unit battery cells.

7. The method according to claim 5, wherein the measuring of the respective charge and discharge characteristics comprises:
measuring the charge and discharge characteristics for a duration of measurement that is shorter than or equal to one minute.

8. The method according to claim 5, wherein in the measuring, the respective mechanical quantities of the first, second and third individually compressed unit battery cells are measured.

9. The method according to claim 8, wherein the measuring the respective mechanical quantities comprises:
measuring respective mechanical deformation amounts of the first, second and third individually compressed unit battery cells by a contact displacement meter, an optical displacement meter, or a gap gauge.

10. The method according to claim 4, wherein the measuring of the respective electrical quantities comprises:
measuring respective impedances of the first, second and third individually compressed unit battery cells.

11. The method according to claim 1, wherein
the third degree of compression of the third unit battery cell is equal to or smaller than a degree of compression of any other unit battery cell that is present in the laminated plurality of unit battery cells, and
the laminating the plurality of unit battery cells in an arrangement comprises positioning the third unit battery cell such that it is located closer to an end in the direction of laminating.

* * * * *